United States Patent [19]

Pole et al.

[11] 4,240,860

[45] Dec. 23, 1980

[54] LATEX-BASED ADHESIVES

[75] Inventors: Ernest G. Pole, Sarnia, Canada; Roy Clark, Libertyville, Ill.

[73] Assignee: Polysar Limited, Sarnia, Canada

[21] Appl. No.: 896,092

[22] Filed: Apr. 13, 1978

[30] Foreign Application Priority Data

May 13, 1977 [CA] Canada .................................. 278372

[51] Int. Cl.$^2$ ............................ C09J 3/12; C09J 5/04; C09J 5/06
[52] U.S. Cl. .................................... 156/327; 156/331; 156/334; 156/338; 428/246; 428/248; 428/250; 428/302; 428/304; 428/316; 428/318; 428/347; 428/349; 428/355; 428/356; 428/492; 428/496; 428/512; 428/521
[58] Field of Search .............. 156/328, 331, 334, 338; 428/512, 519, 521, 494, 495, 496, 492, 246, 248, 250, 302, 304, 316, 317, 318, 347

[56] References Cited

U.S. PATENT DOCUMENTS

| | | | |
|---|---|---|---|
| 2,907,682 | 10/1959 | Eichel | 428/496 X |
| 2,937,109 | 5/1960 | Bartell et al. | 428/496 |
| 3,132,041 | 5/1964 | Pihl | 428/496 |
| 3,475,268 | 10/1969 | Bildusas | 156/328 |
| 3,719,614 | 3/1973 | Wright | 260/2.5 L |
| 3,904,558 | 9/1975 | Graham et al. | 260/2.5 L |

*Primary Examiner*—James C. Cannon
*Attorney, Agent, or Firm*—Stevens, Davis, Miller & Mosher

[57] ABSTRACT

Two preformed materials such as paper, fabrics, glass, sheet metal, at least one of which is pervious to water vapor, are joined together with a solvent-free adhesive based on a latex of a rubbery polymer. The latex is one which is stabilized with an emulsifier which forms water-insoluble compounds with zinc or cadmium ions. Included in the adhesive formulation is an ammonium or amine salt gelling agent for the latex, a zinc or cadmium ion donor compound and sufficient ammonia or a compound which releases ammonia to provide a pH of above 8 to the adhesive formulation. A surface of at least one of the preformed materials is coated with the adhesive and then contacted with a surface of the other material and held in such contact while heating to gel the latex and evaporate the water from the intersurface layer of adhesive.

7 Claims, No Drawings

LATEX-BASED ADHESIVES

BACKGROUND OF THE INVENTION

This invention relates to substantially solvent-free adhesive compositions prepared from latices of rubbery polymers.

Compositions suitable for adhering two surfaces together are known. Some are based on solutions of rubbery polymers in volatile solvents while others are based on dispersions of rubbery polymers in water e.g. aqueous latices of rubbery polymers. With solvent-based adhesives, the rate of bond strength development and the rate of drying may be rapid but the presence of the solvent is disadvantageous with respect to toxicity, flammability, environmental pollution and high cost resulting from the need to recover the solvent. With adhesives based on aqueous latices, the situation is reversed in that toxicity, flammability, pollution and solvent recovery cost problems are non-existent but the rate of bond strength development and the rate of drying have been undesirably slow.

SUMMARY OF THE INVENTION

It has now been found that the rate of bond strength development can be increased considerably in aqueous latex-based adhesive compositions by basing the adhesive on a rubbery polymer latex which is stabilized with an emulsifier which forms water-insoluble compounds with zinc and cadmium ions and including in the adhesive composition an ammonium or amine salt gelling agent for the latex, a zinc or cadmium ion donor compound and sufficient ammonia or ammonia donor compound to provide a pH of above about 8.

Thus, the present invention provides a process for adhering a preformed body which is pervious to water vapour to another preformed body which comprises coating a surface of at least one of the bodies with a water-based adhesive composition comprising as its essential components (a) a rubbery polymer latex stabilized with an emulsifier which forms water-insoluble compounds with zinc and cadmium ions, (b) an ammonium or amine salt gelling agent for the latex, (c) a zinc or cadmium ion donor compound and (d) sufficient ammonia or ammonia donor compound to adjust the pH value of the adhesive composition to above 8, contacting the adhesive-coated surface with a surface of the other body, gelling the latex and removing the water from the inter-surface layer of adhesive while maintaining said contact.

DETAILED DESCRIPTION

The latices which may be used in the present invention are those having a basic pH in which the rubbery polymer particles are stabilized i.e. maintained in suspension by the adsorbed ions of a reactive emulsifying agent which forms water-insoluble compounds on reaction with zinc or cadmium. These include natural rubber latex, synthetic rubber latices in which water-soluble alkali metal or amine salts of rosin acids or $C_5$–$C_{20}$ saturated or unsaturated carboxylic acids form the major proportion of the emulsifier system and blends of these latices. Examples of these emulsifiers are sodium, potassium, ammonium and monomethylamine stearates, oleates, palmitates, laurates, abietates, and mixtures of such emulsifiers. The rubbery polymers may be homopolymers of $C_4$–$C_{10}$ conjugated dienes such as butadiene; 2-methyl butadiene; 2-chloro butadiene; pentadiene-1,3; 2,3-dimethyl pentadiene-1,3; 2,5dimethyl hexadiene-1,5, cyclopentadiene and halo-substituted derivatives of these compounds. The rubbery polymers may also be copolymers of the $C_4$–$C_{10}$ conjugated dienes with each other or with one or more copolymerizable monomers containing a $CH_2=C<—CH=CH—$ group such as styrene, acrylonitrile, methacrylonitrile, acrylic acid, methacrylic acid, methyl methacrylate, ethyl acrylate, acrylamide, acrolein, alpha and beta methyl acroleins, maleic acid, fumaric acid, itaconic acid, cinnamic acid, cinnamaldehyde, vinyl chloride, vinylidene chloride, isobutylene, divinyl benzene and methyl vinyl ketone. If desired, the rubbery polymer latices may be blended with minor proportions of latices of resinous polymers with such as polystyrene, polyacrylonitrile, polyvinylidene chloride, polyvinyl chloride, polyvinyl acetate, polymethyl methacrylate, resinous copolymers of the monomers of these resinous polymers and resinous copolymers of these monomers with other copolymerizable monomers such as the $C_4$–$C_{10}$ conjugated dienes. For best results, the starting latices should contain at least 15 weight % total solids before compounding and preferably about 40–75%. A non-reactive emulsifier can be included as part of the latex stabilization system but since it may retard the rate of gelation, more gelling agent may be required to be used. A non-reactive emulsifier is one which does not react with zinc and cadmium ions to form water-insoluble compounds. Examples of these emulsifiers are alkali metal alkyl sulfates, sulfonates and sulfosuccinamates, fatty alcohol polyethers, alkylene oxide-alkyl phenol condensates, etc.

Along with the latex, the adhesive composition contains as an essential component a latex gelling system composed of an ammonium or amine salt gelling agent, a zinc or cadmium ion donor compound and ammonia or an ammonia donor compound. It is theorized that (1) when these components are mixed the zinc or cadmium donor compound is solubilized by the ammonium or amine salt to form the metal hydroxide; (2) the metal ions liberated by dissociation of the metal hydroxide are complexed by the free ammonia to form metal-amine ions; (3) the metal-amine ions dissociate to form amine ions and hydrated metal ions; and (4) the hydrated metal ions react with the latex-stabilizing emulsifying agent to form water-insoluble metal derivatives thus destabilizing the latex and causing faster bond strength development. With natural latex, the metal derivatives are probably metal proteinates while with synthetic latices they are metal-soap reaction products.

The ammonium or amine salt gelling agents include ammonium sulfate, formate, chloride, carbonate, nitrate, acetate, polyphosphate, sulfamate and the lower (e.g. $C_1$–$C_3$) alkyl, alkylene and alkanolamine sulfamates. The ammonium and amine sulfamates and ammonium polyphosphate are less active in these compositions at ambient temperatures but quite active on exposure to heat. Thus, they provide adhesive compositions with longer storage life. The sulfamate salts are preferred in this respect since they are water-soluble and do not settle out on storage. The polyphosphates are only slightly water-soluble and thus have a greater tendency to settle. The amount of the ammonium or amine salt gelling agent used is 0.1–8 parts per 100 parts by weight of latex solids. The optimum amount will vary depending on the type of gelling salt and the formulation in which it is used.

The presence of a compound which provides zinc or cadmium ions such as an oxide or carbonate of zinc or cadmium is essential in the gelling system of this invention. As indicated earlier, the metal ions react with the latex stabilizer to form a water-insoluble derivative and thus destabilize the latex. 0.5–10 parts of this compound should be used per 100 parts by weight of uncompounded latex solids. Preferably, the amount should be 2–10 parts.

Another essential component of the gelling system is ammonia or a compound which releases ammonia on heating. The ammonia functions as a complexing agent for the metal ions and releases them in a form suitable for reaction with the latex stabilizer so as to cause destabilization of the latex. The amount of free ammonia should be in the range of 0.1–4.0 parts per 100 parts by weight of uncompounded latex solids and preferably 0.3–2.0 parts. Ammonium hydroxide has been found to be a suitable ammonia donor. An easy way to determine when a sufficient amount of ammonia or ammonia donor has been added is by measurement of pH. Preferably the pH of the latex composition should be at least 9.5 and more preferably 10.3 to 11.5. It has been found, however, that when increasing amounts of the previously described non-reactive emulsifiers are present, particularly the non-ionic types, the pH may be as low as 8. It is essential that sufficient free ammonia be present since when ammonia was ommited and the alkalinity was provided by potassium hydroxide, the destabilization rate of the latex was sharply reduced. The reason for this is believed to be that there was insufficient ammonia present to form the metalamine complex. However, good results were obtained by substituting a less volatile amine for some of the ammonia and adding it before, at the same time as or after the addition of the gelling agent. This less volatile amine may be a water-soluble $C_1$ to $C_8$ alkyl or alkanol amine containing 1–5 amino groups. Examples of such compounds are methyl and methanol amines; ethyl and ethanol amines; 1,2-diamino ethane; propyl, isopropyl, propanol and isopropanol amines; 1,2- and 1,3-diamino propanes, 1,4-diamino butane; 1,7-diamino heptane; diethylene triamine; triethylene tetramine; tetraethylene pentamine and choline. Addition of about 0.1–4 parts will give acceptable results within the above pH limitations. When the latex-based adhesive composition is being formulated, the ingredients added tend to cause a drop in the pH of the starting latex. It is raised at this point to above 9.5 and preferably above 10.0 or 10.3 with ammonia or ammonium hydroxide and this will assure that sufficient free ammonia is present for the system to operate properly.

The materials and procedures previously used in preparing solvent-free latex-based adhesive compositions are generally applicable for preparing the adhesive compositions of the present invention. These materials include gelation sensitizers to sharpen the point at which gelation takes place, emulsifying agents and thickeners to provide greater latex stability during compounding and until gelation takes place, antioxidants for ageing resistance, fillers and vulcanization systems. While it is not necessary that they be added in any particular order, it is good practice to add any additional emulsifier prior to adding the other materials. The adhesive compositions can be applied by the usual means in either foamed or unfoamed form. They can be used for adhering water vapour pervious surfaces such as fibrous mats, paper, leather, fabrics, wood, etc. to each other and to non-water vapour pervious surfaces such as metal, plastics, glass, etc. A specific example is adhering paper to the surfaces of an insulating fibrous mat.

The following examples are provided to illustrate the invention in greater detail. Unless otherwise noted, all parts and percentages are on a dry weight basis and all formulations are based on 100 parts of total solids in the uncompounded starting latex.

EXAMPLES 1–6

A potassium oleate stabilized latex having a pH of 10.0 and a total solids content of 66.5% by weight comprising a blend of about 90 parts by weight of a latex of a rubbery copolymer of butadiene and styrene containing 27% polymerized styrene and about 10 parts dry weight of a latex of a homopolystyrene was compounded and tested as shown in the following Table. Examples 1, 2 and 3 are comparison examples in which the adhesive compositions are not prepared according to the invention. Examples 4, 5 and 6 define adhesive compositions prepared according to the invention. They exhibit the desired rapid bond strength development times characteristic of the invention.

TABLE I

| Example | 1 | 2 | 3 | 4 | 5 | 6 |
|---|---|---|---|---|---|---|
| Latex (dry weight) | 100 | 100 | 100 | 100 | 100 | 100 |
| Monoethanolamine sulfamate | — | — | — | — | — | 4.5 |
| Ammonium polyphosphate | — | — | — | 2.1 | — | — |
| Ammonium acetate | — | — | — | — | 1.5 | — |
| Potassium oleate | 1.0 | 1.5 | 1.5 | 1.5 | 1.5 | 2.0 |
| Triethyltrimethylene-triamine | — | 1.0 | 1.0 | 1.0 | 1.0 | — |
| Tripotassium pyrophosphate | — | 0.75 | 0.75 | 0.75 | 0.75 | — |
| Ammonium hydroxide | 1.0 | 1.0 | 1.0 | 1.0 | 1.0 | 2.0 |
| Potassium hydroxide | — | 0.2 | 0.2 | 0.2 | 0.2 | — |
| Hydrated alumina | — | 125.0 | — | 125.0 | 125.0 | — |
| Vulcanization system[a] | — | 5.9 | 5.9 | 5.9 | 5.9 | — |
| Zinc oxide | 1.0 | 5.0 | 5.0 | 5.0 | 5.0 | 1.0 |
| Sodium hexametaphosphate | 0.5 | — | — | — | — | 0.5 |
| Resin emulsion[b] | 100 | — | — | — | — | 100.0 |
| Total solids | 59.6 | 78.2 | 63.3 | 78.4 | 76.9 | 58.2 |
| pH | * | 11.3 | 11.8 | 10.3 | 10.3 | * |
| Storage life (days)[c] | >35 | >35 | >35 | 7.3 | 7.3 | >35 |
| Bond strength development time (hrs.)[d] | >48 | >24 | >24 | 0.05 | 0.05 | 0.2 |
| Mechanical stability (seconds)[e] | 42 | * | >600 | 90 | * | 300 |

[a]A mixture of sulfur (1.65 parts) + zinc diethyldithiocarbamate (1.0 part) + zinc mercaptobenzothiazole (1.25 parts) + zinc oxide (1.25 parts) + antioxidant (0.75 part).
[b]A 10% solution of triethanolamine in water is mixed at 88° C. with a blend of 20 parts of oleic acid and 300 parts of PICCO 6100 (Reg. T.M.). PICCO 6100 is a 70% solution of an aromatic petroleum resin in mineral spirits.
[c]The time required for the formulation to become gelled in a sealed container at room temperature.
[d]The time for a film 0.51 mm thick on a Teflon plate to change from a wet mobile state to a wet immobile state at room temperature.
[e]The time required for the formulation to coagulate sufficiently, on being subjected to mechanical sheer at room temperature by a metal disc 38.1 mm in diameter and 0.32 mm thick spinning at 14,000 rpm, so that it cannot be trowelled smooth.
*-Not measured.

EXAMPLE 7

An adhesive composition was prepared by compounding a sample of the latex of Examples 1–6 with 4.5 parts of monoethanolamine sulfamate, 3.0 parts of zinc oxide and sufficient ammonium hydroxide to raise the pH of the composition to 11.0. It was found that paper could be coated with this adhesive at speeds of up to 200 feet (61 meters) per minute without encountering any serious problem other than foaming of the adhesive compound in the bath. This could be controlled by proper antifoam addition. The adhesive was used to laminate kraft paper to thick glass fiber insulation on commercial scale laminating equipment. The paper and insulation were continuously fed from supply rolls through the laminating equipment where one surface of the paper was first roll coated with a film of the adhesive following which the adhesive coated paper was lightly pressed onto the insulation by means of pressure rolls. The laminate was then allowed to continue through the equipment to dry the adhesive and process the laminate. The operation and results achieved were considered to be very satisfactory i.e. much better than the prior latex adhesives which did not develop bond strength and dry so quickly.

What is claimed is:

1. A process for adhering a preformed body which is pervious to water vapour to another preformed body which comprises coating a surface of at least one of said bodies with a substantially solvent-free water-based adhesive composition comprising a rubbery polymer latex stabilized with an emulsifier which forms water-insoluble compounds with zinc and cadmium ions, an ammonium or amine sulfamate gelling agent for the latex, a zinc or cadmium ion donor compound, and sufficient ammonia or ammonia donor compound to provide a pH of above 8 to the adhesive composition, contacting the adhesive coated surface with a surface of the other body, and heating the intersurface layer of adhesive while maintaining the contact between the two bodies to cause gelation of the latex and removal of the water.

2. A process according to claim 1 in which the latex is a latex of a natural rubber or a rubbery $C_4$–$C_{10}$ diene polymer, the zinc or cadmium ion donor is zinc oxide and the pH is adjusted to a value above 9.5 with ammomium hydroxide.

3. A process according to claim 2 in which the rubbery polymer is a copolymer of butadiene and styrene, the gelling agent is present in amount of 0.1–8 parts by weight, the zinc oxide is present in amount of 0.5–10 parts by weight and a sufficient amount of ammonium hydroxide is used to raise the pH to above 10.3, said parts being parts by weight per 100 parts by weight of solids in the rubbery polymer latex.

4. A process according to claim 3 in which a water-soluble $C_1$ to $C_8$ alkyl or alkanol amine containing 1–5 amino groups is included in the adhesive composition in amount of 0.1–4 parts per 100 parts by weight of uncompounded latex solids as a substitute for part of the ammonia.

5. An adhesively bonded assembly produced by the process of claim 1.

6. An adhesively bonded assembly produced by the process of claim 2.

7. An adhesively bonded assembly produced by the process of claim 3.

* * * * *